United States Patent [19]

Copolillo

[11] Patent Number: 5,438,462
[45] Date of Patent: Aug. 1, 1995

[54] MAGNETIC STORAGE DEVICES WITH DYNAMIC BOOST ADJUSTMENT TO REDUCE READ ERRORS

[75] Inventor: Clement R. Copolillo, Oxnard, Calif.

[73] Assignee: Wangtek, Inc., Simi Valley, Calif.

[21] Appl. No.: 134,202

[22] Filed: Oct. 12, 1993

[51] Int. Cl.$^6$ .................. G11B 5/09; G11B 5/035; G11B 5/02
[52] U.S. Cl. ..................................... 360/53; 360/65; 360/67
[58] Field of Search .................. 360/31, 46, 53, 63, 360/65, 74.4, 77.12, 67

[56] References Cited

U.S. PATENT DOCUMENTS 4,786,984 10/1988 Seeman ............................. 360/31
4,951,282 8/1990 Mester ........................... 360/77.12
5,251,077 10/1993 Saitoh ................................. 360/53
5,287,225 2/1994 Sukigara ............................ 360/31

*Primary Examiner*—Aristotelis Psitos
*Assistant Examiner*—Won Tae C. Kim
*Attorney, Agent, or Firm*—Robbins, Berliner and Carson

[57] ABSTRACT

In a magnetic storage system, an error recovery is performed by reading the magnetic medium again with the filter programmed to a higher boost. If the retry still fails, the magnetic medium is read again with the filter programmed to a lower boost. The filter adjustment can be performed in combination with position adjustment of the read head, i.e. displacing the read/write head from the centerline of the track during error recovery to reduce read errors.

10 Claims, 3 Drawing Sheets

MAGNETIC STORAGE DEVICES WITH DYNAMIC BOOST ADJUSTMENT TO REDUCE READ ERRORS

TECHNICAL FIELD OF THE INVENTION

The present invention is related generally to magnetic storage systems and specifically to an error recovery technique for use in a magnetic storage system. Although the invention is directed to error recovery, it can also be used to reduce error rate in a magnetic storage system.

BACKGROUND OF THE INVENTION

Integrity of stored data in magnetic media, such as magnetic tapes, disks and diskettes, is usually susceptible to the presence of noises. When distortion caused by noises is mild, the data can be restored by error correction techniques such as ECC. When the distortion is severe, however, conventional error correction techniques may not be able to restore the integrity and the stored data may become unusable.

To reduce distortion caused by noises, many conventional magnetic storage devices use a filter to remove unwanted components of the read-out signal. Unfortunately, noises experienced by magnetic storage systems have many causes. These causes include crosstalk, incomplete erasure, feed-through and misregistration. Because the characteristics of these noises are so different, it is usually impossible to cost-effectively eliminate their effects by a simple filter system.

To make matter worse, a device may often have to read data from media which were written by other devices, including devices that are made by different manufacturers using different components and designs. The use of different components and designs further increases the differences of noises and reduces the effectiveness of the filter.

To enable a device to operate with the maximum number of media, the filter in many conventional devices is set to an "compromise level", which is estimated to allow the filter to eliminate noises commonly found in most devices. Unfortunately, while this level may accommodate most devices, it may in some circumstances aggravate the distortion such as by reducing components needed to reproduce the data signal. As a result, the compromise level may sometimes increase the read errors or media errors.

SUMMARY OF THE INVENTION

The present invention provides a magnetic storage device with improved error recovery whereby the device can be more tolerant of noises in the storage media.

In one aspect, the present invention is directed to a storage device for storing and retrieving data from a portion of a magnetic medium. The system comprises a magnetic sensor for sensing flux changes along a first direction of the magnetic medium in a read operation and producing an electrical signal in response to the flux changes. The device also comprises an amplification circuit for providing selective amplification of the electrical signal and a controller responsive to the amplification circuit. The controller comprises an error detector for detecting errors in data embodied in the electrical signal and an error recovery means responsive to an error condition detected by the error detector for dynamically programming the amplification circuit.

In one embodiment, the error recovery means comprises means for adjusting the boost of a filter and re-reading the magnetic medium. By adjusting the boost of the filter, it is hoped that the effects of the noises which cause the error condition can be reduced, thereby eliminating the error condition during the reread operation.

DESCRIPTION OF THE PREFERRED EMBODIMENT

Figure 1:
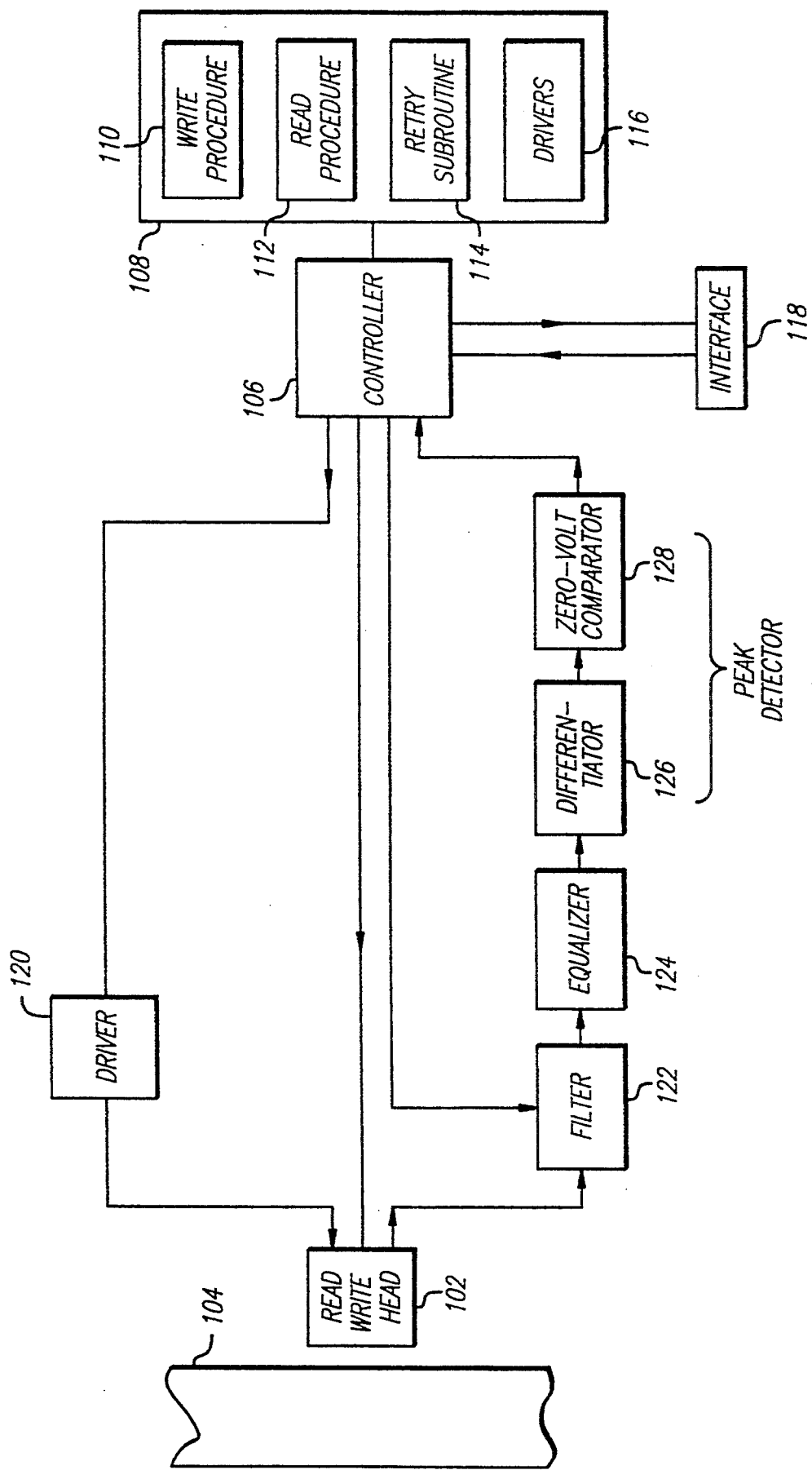
FIG. 1 is a logical block diagram of a tape drive having a programmable filter and a controller capable of programming the filter to enhance error recovery.

FIG. 1 is a logical block diagram of a read/write circuitry 100 in a tape drive wherein the present invention is embodied.

Circuitry 100 comprises a read/write head 102 which operates to produce flux changes onto a tape 104 during a write operation and sense flux changes on the tape 104 during a read operation.

Circuitry 100 also comprises a controller 106 which operates to control the read/write operations of the tape drive. Controller 106 controls these operations by executing instructions stored in a memory 108. These instructions can be divided logically into different procedures, such as a write procedure 110, a read procedure 112, a retry subroutine 114 and several software drivers 116. The software drivers 116 include, for example, a driver which controls a mechanism such as a motor for moving the tape 104 longitudinally relative to the read/write head 102, and a driver for controlling another mechanism such as a motor for moving the read/write head 102 in a direction perpendicular to the direction of movement of the tape 104.

Data input into and output from the tape 104 are communicated through a conventional interface 118.

As in conventional tape drives, data to be written onto the tape 104 are encoded by controller 106 using such technique as group code recording (GCR). The encoded signal is transmitted to a driver 120 whereby it energizes the read/write head 102 to produce flux reversals on the magnetic coating of the tape 104. The write operation is performed by the controller 106 by executing the write procedure 110 stored in memory 108.

In a read operation, flux changes recorded on the tape 104 are sensed by a magnetic sensor in read/write head 102. The magnetic sensor produces an electrical signal in response the flux changes. The electrical signal is then applied to a read channel which has a programmable filter 122, such as the filter from International Microelectronic Products, Inc. with the part number of IMP42C451, whose amplitude and phase response can be modified by applying a digital signal through a digital interface therein. The data sheet of the IMP42C451 is incorporated herein by reference.

Filter 122 outputs a signal which is eventually applied to a differentiator 126 and a zero-volt comparator 128 which cooperate therebetween to form a peak detector. The output of the peak detector is transmitted to the controller 106.

Controller 106 then separates the electrical signal into a data signal and a clock signal. The data signal is then sent to an error-detector which checks the integrity of the data signal, using conventional error correction techniques such as cyclic redundant codes (CRC).

If the data signal has errors which are correctable by conventional error correction schemes, the controller 106 would correct the errors before outputting the data to the interface 118.

If the data signal has errors which are uncorrectable by the conventional error correction schemes, the controller 106 would perform the error recovery procedure as described hereinbelow.

Figure 2:
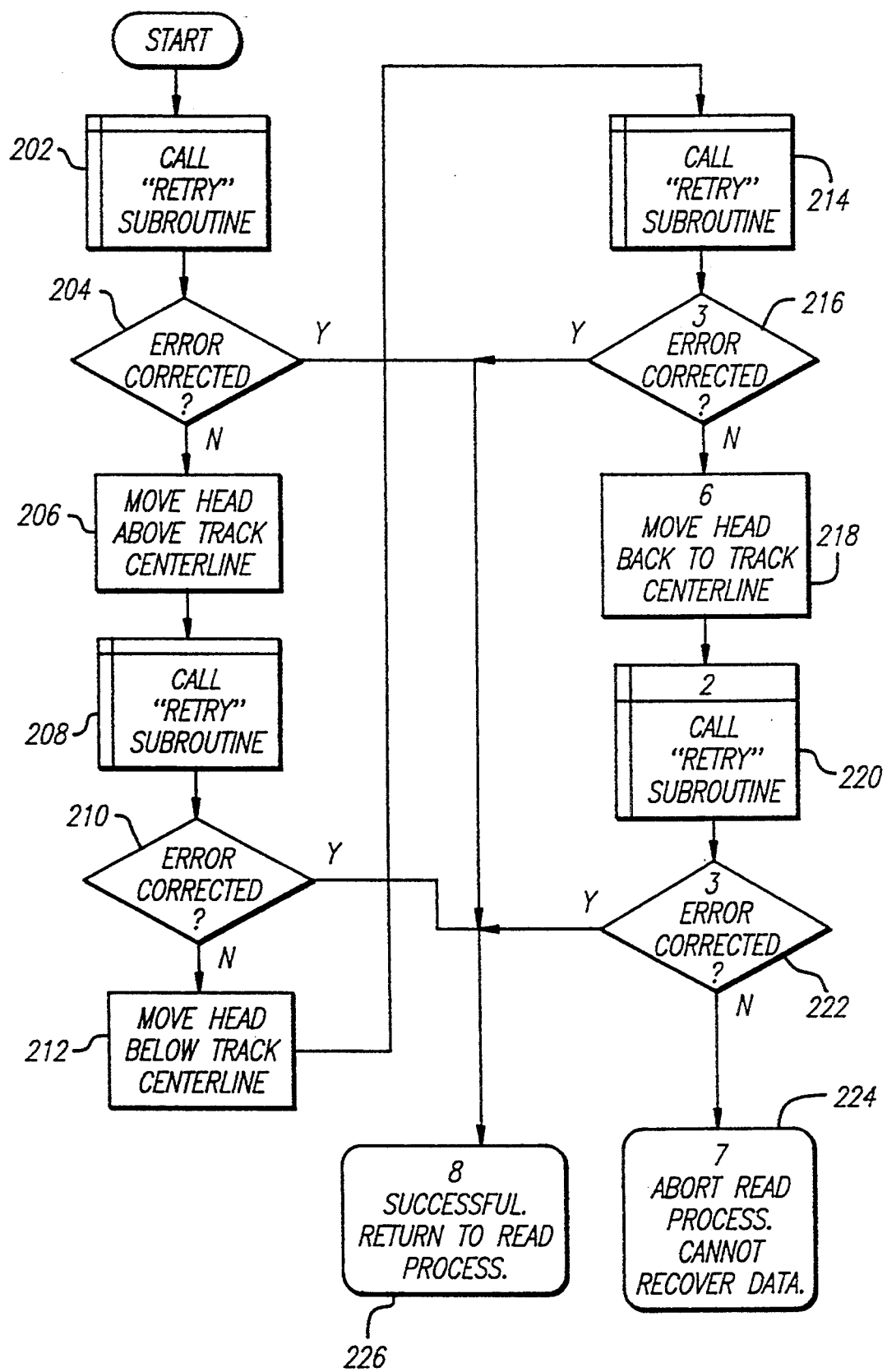
FIG. 2 is a flow chart showing the logical steps of a retry operation in a read operation.

FIG. 2 is a flow chart showing the logical steps of the read procedure 112 when an uncorrectable error condition is encountered in reading a particular portion (the "defective portion") of the tape 104.

When an uncorrectable error condition is detected, controller 106 will call the retry subroutine 114 (step 202).

Figure 3:
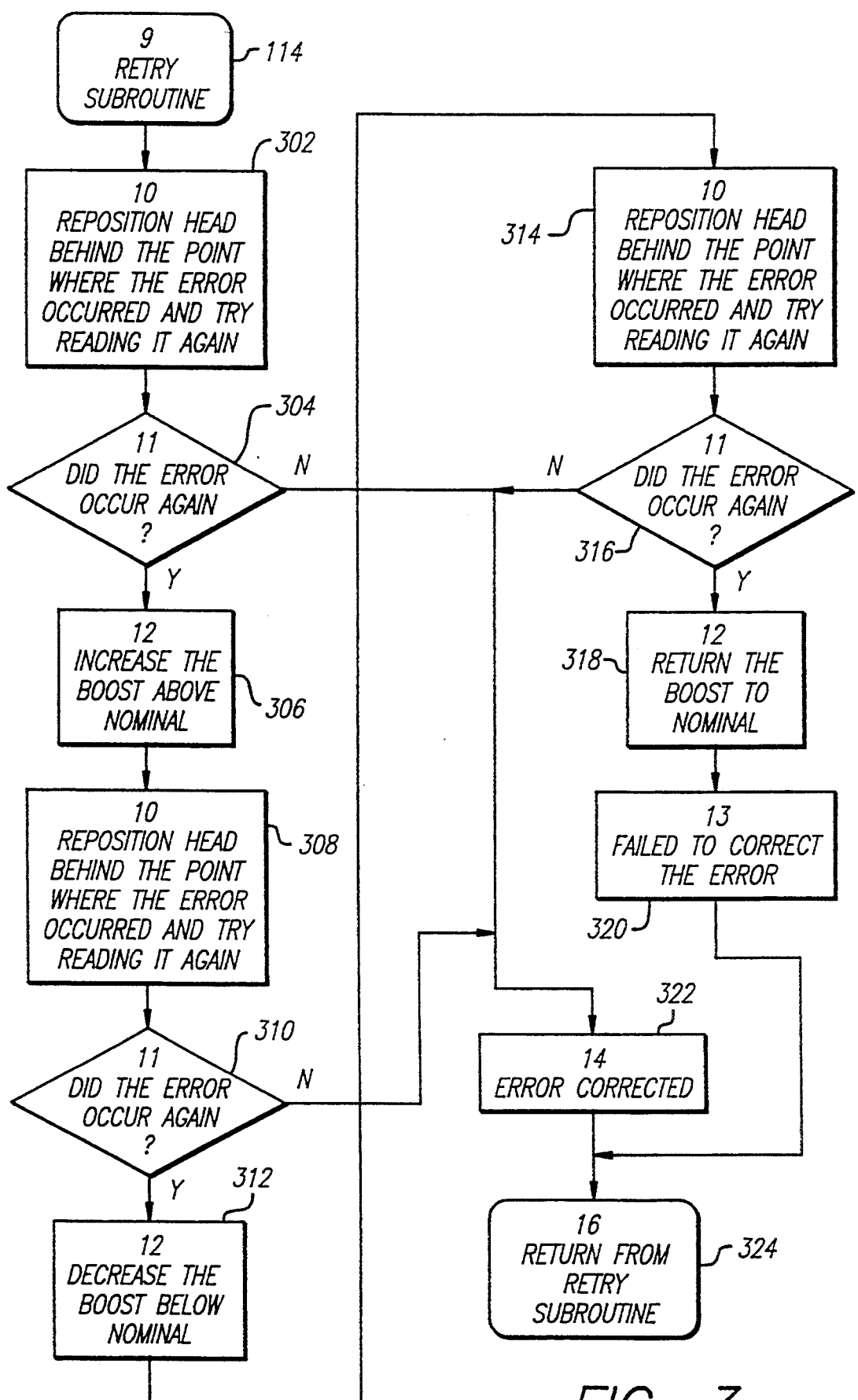
FIG. 3 is a flow chart showing the logical steps of the retry subroutine.

The logical steps performed by the retry subroutine 114 are shown in the flow chart of FIG. 3.

When the retry subroutine 114 is entered, tape 104 is rewound and the defective portion of tape 104 is reread (step 302).

When the defective portion of tape 104 is reread, controller 106 checks to see if the reread operation produces any uncorrectable error condition (step 304).

If the defective portion is read without an uncorrectable error condition, controller 106 will send a flag to the read procedure 112 (step 322) indicating that the error is corrected and exit the retry subroutine 114 (step 324).

If an uncorrectable error condition is still detected in the reread operation, controller 106 will increase the boost of the filter 122 to 3 dB over the nominal value (step 306).

In a IMP42C451 filter, the boost can be changed by applying a serial signal to the SDI input of the filter to set registers "001" and "010". The values of the bits D3, D2 D1 and D0 required to set the filter to a proper boost are listed in the data sheet of the IMP42C451 filter.

After the boost of the filter 122 is increased, the tape 104 is rewound and the defective portion is reread (step 308).

When the defective portion of tape 104 is reread, controller 106 checks to see if an uncorrectable error condition still exists (step 310).

It will be understood that because the boost of the filter 122 has been changed, the read operation may become susceptible to noises that are different from the noises which cause the original uncorrectable error condition. Therefore, when the boost is changed, the uncorrectable error condition may be caused by a different set of errors.

If the defective portion of tape 104 can be read without an uncorrectable error, controller 106 will set a flag to indicate that the error has been corrected (step 322) and exit the retry subroutine 114 (step 324).

If the defective portion of tape 104 still has an uncorrectable error condition, the controller 106 will then decrease the boost of filter 122 to 3 dB below the nominal value (step 312). The boost of the filter 122 is decreased by applying a serial signal to the filter 122 through the SDI interface and setting bits d0–d3 of registers "001" and "010" to the proper values.

After the boost of filter 122 is decreased, tape 104 is rewound and the defective portion is reread (step 314).

When the defective portion is reread, controller 106 checks to see if the data still have an uncorrectable error (step 316).

If there is no uncorrectable error in the reread data, controller 106 will set a flag to indicate that the error has been corrected (step 322) and exit the retry subroutine 114 (step 324).

If the reread data still have an uncorrectable error, controller 106 will reset the boost of filter 122 to its nominal value (step 318). A flag is then set to indicate that the retry subroutine 114 has failed (step 320) and control is returned to the read procedure 112 (step 324).

Referring again to FIG. 2, when control is returned to the read procedure 112, controller 106 checks to see if the retry operation is accomplished successfully (step 204).

If the retry subroutine 114 reads the tape 104 without any uncorrectable errors, the controller 106 will continue with the normal read operation (step 226).

On the other hand, if retry subroutine 114 fails to read the defective portion of tape 104 with no uncorrectable error, controller 106 will move the read/write head 102 to one side of the track's centerline (step 206).

After the read/write head 102 is moved to the new position, controller 106 will call the retry routine 114 again (step 208).

When the controller 106 returns from the retry subroutine 114, it checks to see if an uncorrectable error still exists (step 210). If the tape 104 was read successfully during the retry, controller 106 will continue with the read operation (step 226).

If the retry subroutine 114 still cannot read the defective portion of tape 104 successfully, controller 106 will move the read/write head 102 to the other side of the track's centerline (step 212) and call the retry subroutine 114 again (step 214).

When retry subroutine 114 is exited, controller 106 checks to see if there is still an uncorrectable error (step 216). If no uncorrectable error is encountered, controller 106 will continue with the normal read operation (step 226).

On the other hand, if there is still an uncorrectable error, controller 106 will move the read/write head 102 back to the track's center line (step 218) and the retry subroutine 114 is called again (step 220).

If the retry subroutine 114 still experiences an uncorrectable error condition, the read process is aborted (step 224).

Thus, in a read operation, if an uncorrectable error is encountered, controller 106 will adjust the boost of filter 122 to see if the cause(s) of the error can be alleviated. In this way, error recovery is enhanced.

It is understood that the above-described embodiment is merely provided to illustrate the principles of the present invention, and that other embodiments may readily be devised using these principles by those skilled in the art without departing from the scope and spirit of the invention.

What is claimed is:

1. A storage device for storing and retrieving data from a portion of a magnetic medium, comprising:
   a magnetic sensor for sensing flux changes along a first direction of the magnetic medium in a read operation and producing an electrical signal in response to the flux changes;
   an amplification circuit for providing selective amplification of the electrical signal, wherein the amplification circuit is a filter having a programmable boost and wherein the error recovery means comprises means responsive to the error condition for programming the boost of the filter to a first value and re-reading the portion of the magnetic medium in a first retry operation; and a controller responsive to the amplification circuit, comprising:

an error detector for detecting errors in data embodied in the electrical signal; and.

an error recovery means responsive to an error condition detected by the error detector for dynamically programming the amplification circuit, wherein the error recovery means further comprises means responsive to an error condition detected by the error detector during the first retry operation for programming the boost of the filter to a second value and rereading the portion of the magnetic medium in a second retry operation.

2. A storage device as in claim 1, wherein one of the first and second values is higher than a nominal value and the other one of the first and second values is lower than the nominal value.

3. A storage device as in claim 2, wherein the error recovery means further comprises means for moving the magnetic sensor to a first new position in a second direction perpendicular to the first direction during a third retry.

4. A storage device as in claim 3, wherein the error recovery means further comprises means for moving the magnetic sensor to a second new position in a third direction opposite to the second direction during a fourth retry.

5. A storage device as in claim 4, wherein the magnetic medium is a magnetic tape.

6. In a magnetic storage system having a magnetic sensor for sensing flux changes in a magnetic medium and producing an electrical signal in response to the flux changes, a method for reading data from a portion of the magnetic medium, comprising the steps of:

(a) sensing flux changes in the portion of magnetic medium along a first line;

(b) producing an electrical signal in response to the flux changes;

(c) amplifying the electrical signal based upon a predetermined function, wherein the amplifying step comprises the steps of filtering the electrical signal with a first boost;

(d) decoding the electrical signal into data;

(e) detecting whether the data contain an error condition; and (f) adjusting the function in the amplifying step if the error condition is detected in the detecting step, wherein the adjusting step comprises the step of adjusting the filter to a second boost, and wherein the method further comprises the step of repeating the steps (a)-(e) in a first retry operation after the adjusting step and adjusting the filter to third boost and repeating the steps (a)-(e) in a second retry operation if an error condition is detected in the first retry operation.

7. A method as in claim 6, wherein one of the second and third boosts is higher than the first boost and the other one of the second and third boosts is lower than the first boost.

8. A method as in claim 7, further comprising the step responsive to an error condition detected in the detection step of moving the sensor in a first direction to a second line parallel to the first line and repeating the steps (a)-(f) in a third retry operation.

9. A method as in claim 8, further comprising the step of moving the sensor in a second direction, opposite to the first direction, to a third line parallel to the first line and repeating the steps (a)-(f) in a fourth retry operation.

10. A method as in claim 9, wherein the storage medium is a magnetic tape.

* * * * *